D. C. WHEELER.
DRAW CUT SHEARS.
APPLICATION FILED JULY 21, 1909.
953,365.
Patented Mar. 29, 1910.
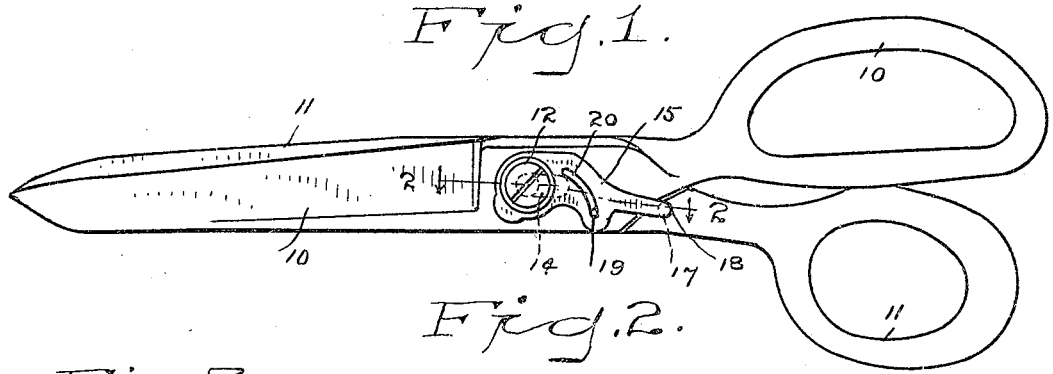
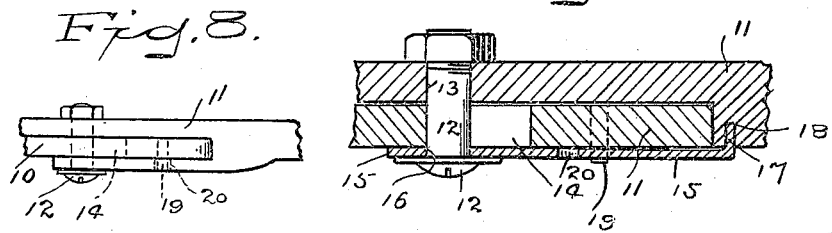
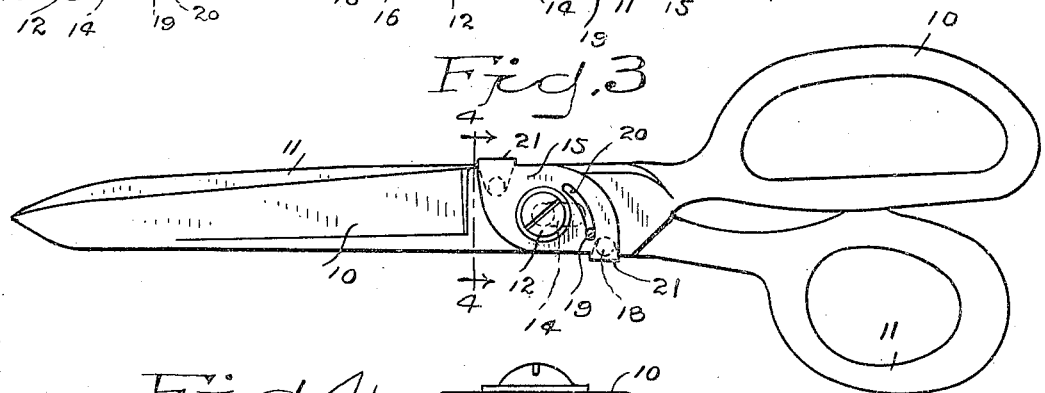
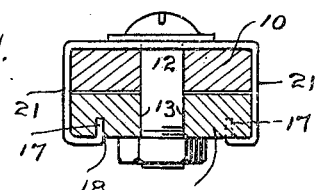
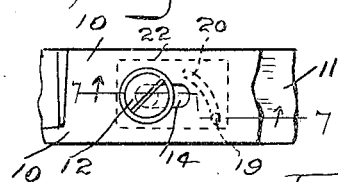
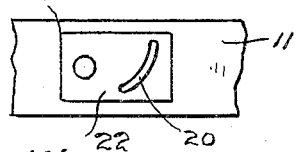
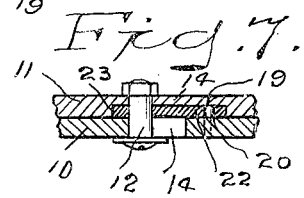
WITNESSES:
H. A. Lamb,
S. W. Atherton.
INVENTOR
David C. Wheeler
BY
A. M. Wooster
ATTORNEY

UNITED STATES PATENT OFFICE.

DAVID C. WHEELER, OF BRIDGEPORT, CONNECTICUT, ASSIGNOR TO THE ACME SHEAR COMPANY, OF BRIDGEPORT, CONNECTICUT, A CORPORATION OF CONNECTICUT.

DRAW-CUT SHEARS.

953,365.  Specification of Letters Patent.  Patented Mar. 29, 1910.

Application filed July 21, 1909. Serial No. 508,780.

*To all whom it may concern:*

Be it known that I, DAVID C. WHEELER, a citizen of the United States, residing at Bridgeport, county of Fairfield, State of Connecticut, have invented an Improvement in Draw-Cut Shears, of which the following is a specification.

This invention has for its object to provide a simple and inexpensive mode of pivoting the blades of shears together that will cause one of said blades to move inward relatively to the other when closing, thus producing a draw cut, the action of the blades being to draw the article that is being cut inward between the blades instead of to push it outward as in ordinary shears.

With this and other objects in view I have devised the novel shears which I will now describe, referring to the accompanying drawing forming a part of this specification and using reference characters to indicate the several parts.

Figure 1 is a plan view of shears, illustrating one mode in which I have carried the invention into effect; Fig. 2 a section on an enlarged scale on the line 2—2 in Fig. 1 looking in the direction of the arrows, the members being inverted; Fig. 3 a view corresponding with Fig. 1, illustrating a variant form of the invention; Fig. 4 a section on an enlarged scale on the line 4—4 in Fig. 3, looking in the direction of the arrows; Fig. 5 a detail plan view illustrating another variant form of the invention; Fig. 6 a plan view of the lower member, corresponding with Fig. 5; Fig. 7 a section on the line 7—7 in Fig. 5, looking in the direction of the arrows; and Fig. 8 is a detail elevation corresponding with Fig. 2, showing the member and the retaining plate made integral.

In Figs. 1 and 2, 10 and 11 denote the members of a pair of shears and 12 the pivot pin. This pivot pin passes through a hole 13 in member 11 and through a longitudinal slot 14 in member 10. Member 11 may be described as a relatively fixed member and member 10 as a longitudinally movable member.

In Fig. 2, the members are in the closed position and the pivot pin is at the left end of slot 14. In the opening movement of the members, member 10 in addition to the usual movement will move longitudinally outward relatively to member 11 and the pivot pin will be moved to the right end of slot 14. In the closing movement, member 10 will move inward longitudinally relatively to member 11 from the position just described to the position shown in Figs. 1 and 2, thereby producing the draw cut. This is the essential principle of the invention. In addition, it is necessary that means be provided to retain member 10 at all times against other than its normal movement. These means may be greatly varied without departing from the principle of the invention.

In the form illustrated in Figs. 1 and 2, an external retaining plate 15 is provided which is secured in any suitable manner to member 11. As shown in the drawing, the retaining plate is provided with a hole 16 through which the pivot pin passes and at its opposite end with an inwardly-turned lug 17 which engages a hole 18 in the member. If preferred, the retaining plate may be made integral with member 11, as shown in Fig. 8, although for convenience in manufacturing I have shown it in Figs. 1, 2, 3 and 4 as made separate and secured thereto. 19 denotes a pin rigidly anchored in member 10 and engaging a curved slot 20 in the retaining plate. In the opening and closing movements of the members, pin 19 passes approximately from end to end of slot 20 and back again.

In the form illustrated in Figs. 3 and 4, slots 14 and 20 and pin 19 are as before but the retaining plate is differently shaped and is provided with integral arms 21 which inclose the members and each of which is provided with a lug 17 engaging a hole 18 in member 11.

In the form illustrated in Fig. 8, the retaining plate is cast integral with member 11, slots 14 and 20 and pin 19 being as before. In assembling this form, pin 19 is inserted after the pivot pin is in place.

In the form illustrated in Figs. 5, 6 and 7, the external retaining plate is dispensed with and an internal retaining plate 22 is used in its stead. This internal retaining plate is seated in a correspondingly-shaped recess 23 in the inner side of member 11. Plate 22 is provided with a curved slot 20 which receives pin 19, the only difference between this and the other forms being that pin 19 projects inward from member 10 and engages a slot in an internal retaining plate instead of extending outward and engaging a slot in an external retaining plate. In the form last described, the external appearance of the shears does not differ from that of ordinary shears.

The operation in use is the same in all the forms. When the members are moved to the open position, member 10 in addition to its movement away from member 11 is moved outward relatively to said member and in the closing movement member 10 is drawn inward longitudinally relatively to member 11, producing a draw cut and tending to draw the material that is being operated upon inward between the blades instead of forcing it outward as in ordinary shears.

Having thus described my invention I claim:—

1. Shears comprising a pivot pin, a member having a hole through which said pin passes, a member having a longitudinal slot through which said pin passes, a projecting pin carried by said member and a retaining plate through which the pivot pin passes and which is attached to one of the members and is provided with a curved slot engaged by the projecting pin.

2. Shears comprising a pivot pin, a member having a hole through which said pin passes, a member having a longitudinal slot through which said pin passes, a projecting pin carried by said member and a retaining plate through which the pivot pin passes and which is attached to the member having the hole and is provided with a curved slot engaged by the projecting pin.

In testimony whereof I affix my signature in presence of two witnesses.

DAVID C. WHEELER.

Witnesses:
DWIGHT C. WHEELER,
JOHN J. CONWAY.